(12) United States Patent
Lattner

(10) Patent No.: US 11,440,106 B2
(45) Date of Patent: Sep. 13, 2022

(54) DEEP HOLE DRILLING METHOD AS WELL AS TOOL FOR A DEEP HOLE DRILLING MACHINE AND DEEP HOLE DRILLING MACHINE

(71) Applicant: Schmidt + Clemens GmbH + Co. KG, Lindlar (DE)

(72) Inventor: Detlev Lattner, Marienheide (DE)

(73) Assignee: Schmidt + Clemens GmbH + Co. KG, Lindlar (DE)

( * ) Notice: Subject to any disclaimer, the term of this patent is extended or adjusted under 35 U.S.C. 154(b) by 0 days.

(21) Appl. No.: 16/342,344

(22) PCT Filed: Oct. 26, 2017

(86) PCT No.: PCT/EP2017/077476
§ 371 (c)(1),
(2) Date: Apr. 16, 2019

(87) PCT Pub. No.: WO2018/078030
PCT Pub. Date: May 3, 2018

(65) Prior Publication Data
US 2019/0255624 A1    Aug. 22, 2019

(30) Foreign Application Priority Data

Oct. 26, 2016 (DE) .......................... 102016012907.7

(51) Int. Cl.
*B23B 35/00*    (2006.01)
*B23B 41/00*    (2006.01)
(Continued)

(52) U.S. Cl.
CPC .............. *B23B 41/003* (2013.01); *B23D 5/02* (2013.01); *B23D 13/00* (2013.01); *B23B 35/00* (2013.01); *B23B 2215/72* (2013.01)

(58) Field of Classification Search
CPC ... B23B 41/003; B23B 35/00; B23B 2220/12; B23B 2220/123; B23B 2215/72;
(Continued)

(56) References Cited

U.S. PATENT DOCUMENTS 2,383,356 A    8/1945    Walker
2,420,298 A *  5/1947    Breakefield ............ B22D 13/00
                                                             164/114
(Continued)

FOREIGN PATENT DOCUMENTS

CA    2493463 A1    2/2004
CA    2493463 C     1/2013
(Continued)

OTHER PUBLICATIONS

Search Report and Written Opinion dated Jan. 23, 2019 in counterpart PCT Application No. PCT/EP2017/077476.

*Primary Examiner* — Eric A. Gates
*Assistant Examiner* — Chwen-Wei Su
(74) *Attorney, Agent, or Firm* — Howard IP Law Group, PC

(57) ABSTRACT

The invention relates to a deep hole drilling method for producing a pipe with an inner profile which has at least one recess extending helically along the inner side of the pipe, wherein with a deep hole drilling machine a tool, comprising a basic body extending along a longitudinal axis and at least one cutting edge arranged on an outer circumference of the basic body, is pulled or pushed through the interior of the pipe while being turned about its longitudinal axis, so that the cutting edge completes a cut along a helical cutting line on the inner side of the pipe.

13 Claims, 6 Drawing Sheets

(51) Int. Cl.
*B23D 5/02* (2006.01)
*B23D 13/00* (2006.01)

(58) Field of Classification Search
CPC ........ B23D 5/02; B23D 13/00; B23D 43/005;
Y10T 409/400175; Y10T 409/40315;
Y10T 409/402975; Y10T 409/502952;
Y10T 409/502788
See application file for complete search history.

(56) References Cited

U.S. PATENT DOCUMENTS

| | | | |
|---|---|---|---|
| 2,641,822 A | | 6/1953 | Sampson |
| 2,943,381 A | | 7/1960 | Cotterman et al. |
| 3,865,639 A | * | 2/1975 | Bellot ...................... C21D 9/50 |
| | | | 148/521 |
| 5,836,077 A | * | 11/1998 | Usui ...................... B23B 29/02 |
| | | | 29/898.02 |
| 6,408,557 B1 | | 6/2002 | Zaeper et al. |
| 7,963,318 B2 | * | 6/2011 | Wolpert ...................... F28F 1/40 |
| | | | 165/184 |
| 8,123,441 B2 | | 2/2012 | Pieri |
| 9,249,482 B2 | * | 2/2016 | Jakobi ...................... C22C 19/055 |
| 10,596,647 B2 | * | 3/2020 | Kopton ...................... B23G 1/16 |
| 2003/0019533 A1 | * | 1/2003 | Demarest ...................... F28F 1/40 |
| | | | 138/177 |
| 2012/0288343 A1 | | 11/2012 | Symonds |
| 2015/0093207 A1 | | 4/2015 | Lawes et al. |

FOREIGN PATENT DOCUMENTS

| | | |
|---|---|---|
| CN | 87 1 01911 A | 11/1988 |
| CN | 2145082 Y | 11/1993 |
| CN | 101049641 B | 10/2007 |
| CN | 104511624 A | 4/2015 |
| DE | 301272 | 12/1916 |
| DE | 649830 | 8/1937 |
| DE | 2750766 A1 | 5/1979 |
| EP | 0376204 A2 | 7/1990 |
| EP | 1099491 A2 | 5/2001 |
| EP | 1525289 B9 | 4/2005 |
| FR | 1396349 | 3/1965 |
| GB | 229311 A | 5/1926 |
| GB | 627046 A | 7/1949 |
| RU | 46962 U1 | 8/2005 |
| RU | 2369468 C1 | 10/2009 |
| RU | 2630914 C1 | 9/2017 |
| SU | 818765 A1 | 4/1981 |
| WO | 2010043375 A1 | 4/2010 |
| WO | 2012154866 A1 | 11/2012 |

* cited by examiner

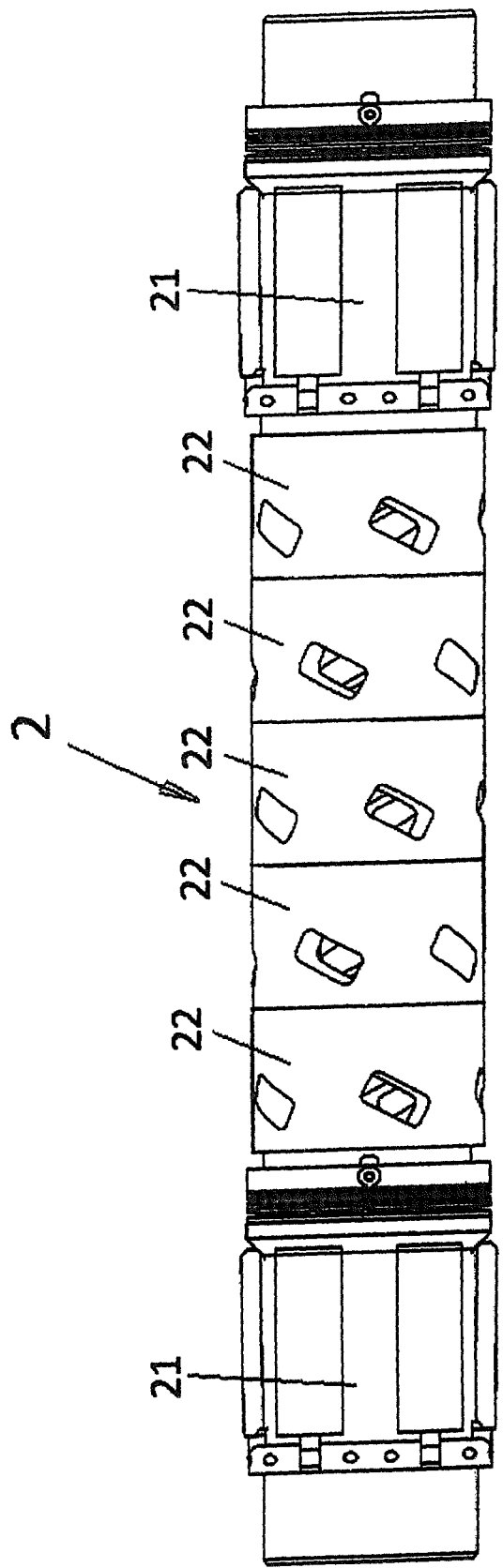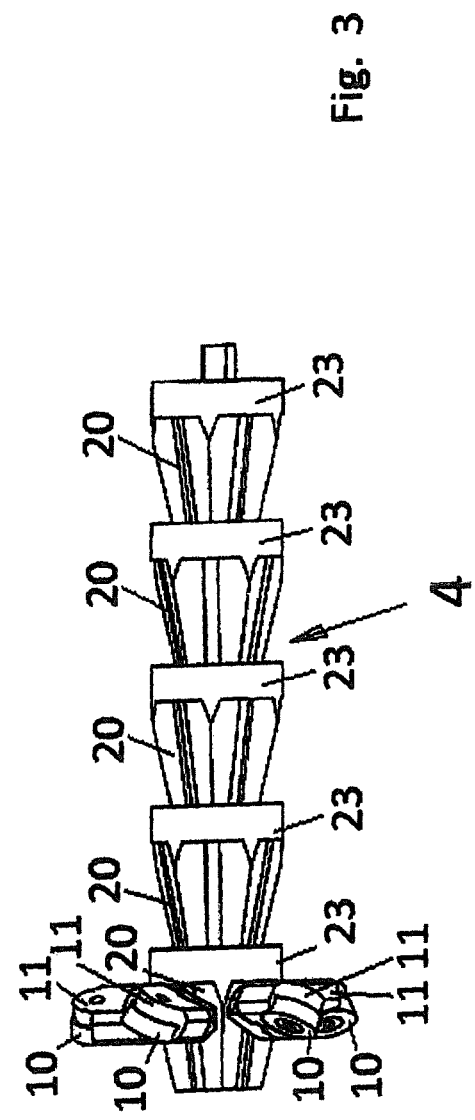
Fig. 3

DEEP HOLE DRILLING METHOD AS WELL AS TOOL FOR A DEEP HOLE DRILLING MACHINE AND DEEP HOLE DRILLING MACHINE

CROSS-REFERENCE TO RELATED APPLICATIONS

This application is the national stage application under 35 U.S.C. § 371 of International Application No. PCT/EP2017/077476 filed on 26 Oct. 2017, and claims the benefit of DE 10 2016 012 907.7 filed on 26 Oct. 2016, the entire disclosures of which are incorporated herein by reference in their entireties.

The invention relates to a deep hole drilling method for producing a pipe, a tool for a deep hole drilling machine and a deep hole drilling machine.

Deep drilling or deep hole drilling is a cutting processing method for producing and finishing drilled holes whose diameters are between d=0.2 to 2000 mm and whose drilling depth is usually greater than 3 times the diameter.

From EP 1 525 289 B9 a ribbed pipe for the thermal splitting of hydrocarbons is known, which in relation to the pipe axis has inclined helically extending inner ribs.

Known from WO 2010/043375 A1 is a nickel-chromium alloy with a high resistance to oxidation and carburisation, creep rupture strength and creep resistance consisting of 0.4 to 0.6% carbon, 28 to 33% chromium, 15 to 25% iron, 2 to 6% aluminium, up to 2% silicon, up to 2% manganese. up to 1.5% niobium, up to 1.5% tantalum, up to 1.0% tungsten, up to 1.0% titanium, up to 1.0% zirconium, up to 0.5% yttrium, up to 0.5% cerium, up to 0.5% molybdenum, up to 0.1% nitrogen, with the remainder nickel including melt-related impurities.

Against this background, the object of the invention was to propose a method of producing a device for producing a pipe with an inner profile which has at least one recess helically extending along the inner side of the pipe.

The invention is based on the basic idea that advantages are achieved if the cutting edge of the tool does not only move in a circumferential direction at one particular point within the pipe and through radial positioning of the cutting edge the section of the inner profile lying at this point is produced. According to the invention the cutting direction of the cutting edge in deep hole drilling should no longer only be in the circumferential direction. Rather, the invention proposes conveying the cutting edge of the tool helically along the inside of the pipe and in this way producing the recess extending helically along the inside of the pipe.

For this, as within the framework of the deep hole drilling method according to the invention, the invention proposes pushing or pulling with a deep hole drilling machine a tool that as a basic body extending along a longitudinal axis and a least one cutting edge arranged on the outer circumference of the basic body, through the interior of the pipe while turning the tool about its longitudinal axis and/or turning the pipe about its longitudinal axis so that the cutting edge completes a cut along a helical cutting line on the inner side of the pipe. Alternatively the invention envisages pushing or pulling the pipe with its device along a longitudinal axis over a tool, that has a basic body extending along a longitudinal axis and at least one cutting edge arranged on the outer circumference of the basic body, and at the same time turning the pipe about its longitudinal axis and/or turning the tool about is longitudinal axis so that the cutting edge completes a cut along a helical cutting line on the inside of the pipe.

This type of procedure offers the advantage that the cutting tool edge leaves the tool more frequently and therefore there is the possibility, in the case of the particularly preferably used indexable cutting inserts, on which the cutting edge is present, of replacing the cutting edge when the cutting edge is worn. Cutting only in the circumferential direction with step-wise movement of the tool in the axial direction, when cutting in the circumferential direction is ended at the relevant location, leads to longer engagement times of the cutting edge in the pipe and conceals the problem that in the event of a possibly required replacement of the cutting edge the tool has to be retracted back to precisely the point at which the cutting processes was ended before replacement of the cutting edge.

The method according to the invention therefore envisages a superimposed rotational movement and axial movement of the tool relative to the pipe during cutting. The rotational movement and the axial movement can be matched to each other in such a way that a helical cutting line of the cutting edge is produced on the inner side of the pipe which has the same pitch as the helically extending recess to be produced on the inner side of the pipe.

The invention is described using the terms deep hole drilling method, deep hole drilling and deep hole drilling machine. Here it is assumed that these terms are usually used to describe a cutting processing method or a drilling machine to be used in such cutting processing methods, which are used to produce and finish drilled holes with a diameter of d=0.2 to 2000 mm and with a drilling depth usually more than 3 times the diameter. In the context of the description of the term deep hole drilling method, deep hole drilling and deep hole drilling machine should, however, be understood in such a way that in general they describe a finishing method and machine (device) used for such a finishing method with which the superimposed rotational and axial movement of the tool relative to the pipe in accordance with the invention can be carried out during cutting. It is therefore conceivable that the method according to the invention is carried out with a lathe or a CNC machine. Both a lathe and a CNC machine offer the possibility of carrying out the invented superimposed rotational and axial movement of the tool relative to the pipe during cutting. Only in one specially preferred form of embodiment are the terms deep hole drilling, deep drilling and deep drilling machine understood to the effect that they describe a cutting finishing method or a drilling machine to be used in such a finishing method for producing and finishing drilled holes with a diameter of between d=0.2 to 2000 mm, with drilling depth using greater than 3 times the diameter.

The overlaid rotational movement and axial movement of the tool relative to the pipe during cutting as envisaged by the invention can be brought about in various ways.

In a preferred form of embodiment, with a deep hole drilling machine the tool is pulled through the interior of the pipe while being turned about its longitudinal axis so that the cutting edge completes a cut along a helical cutting line on the inner side of the pipe. In particular, it is preferable that the pipe is not turned about its longitudinal axis. In a preferred form of embodiment with a deep hole drilling machine the tool is pushed through the interior of the pipe while being turned about its longitudinal axis so that the cutting edge completes a cut along a helical cutting line on the inner side of the pipe. In particular it is preferable that the pipe is not turned about its longitudinal axis. In a preferred form of embodiment, with a deep drilling machine the tool is pulled through the interior of the pipe and the pipe is turned about its longitudinal axis so that cutting edge completes a cut along a helical cutting line on the inner side of the pipe. In particular it is preferable it is preferably that the tool is not turned about its longitudinal axis. In a preferred form of embodiment, with a deep drilling machine the tool is pushed through the interior of the pipe and the pipe is turned about its longitudinal axis so that cutting edge complete a cut along a helical cutting line on the inner side of the pipe. In particular it is preferable that the tool is not turned about its longitudinal axis. In a preferred form of embodiment, with a deep hole drilling machine the tools is pulled through the interior of the pipe and the pipe is turned about its longitudinal axis and the tool turned about its longitudinal axis so that the cutting edge completes a cut along a helical cutting line on the inner side of the pipe. In a preferred form of embodiment, with a deep hole drilling machine the tools is pushed through the interior of the pipe and the pipe is turned about its longitudinal axis and the tool turned about its longitudinal axis so that the cutting edge completes a cut along a helical cutting line on the inner side of the pipe. In a preferred form of embodiment the pipe is pulled over the tool with a device and tool is turned about its longitudinal axis so that the cutting edge completes a cut along a helical cutting line on the inner side of the pipe. It is particularly preferable that the pipe is not turned about its longitudinal axis. In a preferred form of embodiment the pipe is pushed over the tool with a device and tool is turned about its longitudinal axis so that the cutting edge completes a cut along a helical cutting line on the inner side of the pipe. It is particularly preferable that the pipe is not turned about its longitudinal axis. In a preferred form of embodiment the pipe is pulled over the tool and the pipe is turned about its longitudinal axis so that the cutting edge completes a cut along a helical cutting line on the inner side of the pipe so that the cutting edge completes a cut along a helical cutting line on the inner side of the pipe. In a preferred form of embodiment the pipe is pushed over the tool and the pipe is turned about its longitudinal axis so that the cutting edge completes a cut along a helical cutting line on the inner side of the pipe so that the cutting edge completes a cut along a helical cutting line on the inner side of the pipe.

In a preferred form of embodiment the method according to the invention envisages that that recess extending helically along the inner side of the pipe is produced by several cuts, wherein in the case of each cut the tool is pulled or pushed through the interior of the pipe and at the same time turned about its longitudinal axis and/or the pipe is turned about is longitudinal axis so that the cutting edge completes the relevant cut along a helical cutting line on the inner side of the pipe. In an alternative, also preferred form of embodiment in each cut the pipe is pulled or pushed over the tool whereby it is turned about its longitudinal axis and/or the tool is turned about its longitudinal axis so that the cutting edge completes the relevant cut along a helical cutting line of the inner side of the pipe. This method also makes it possible to load the cutting edge as little as possible in that the material removal per cut is kept small and the recess is produced in several cuts. In a preferred form of embodiment the recess is produced with at least three, particularly preferably with at least four, more particularly preferably with at least five and very particularly preferably with at least six cuts.

In a preferred form of embodiment of the previously described form of embodiment in which the recess is produced with several cuts the radial distance of the cutting edge relative to the longitudinal axis of the basic body is changed between a first cut and a second cut. In this way the cutting edge can be adapted to the increasing depth of the recess.

Additionally or alternatively in a preferred form of embodiment it can be envisaged to provide the cutting edge of the tool in the form of indexable cutting inserts and changing the indexable cutting inserts between a first cut and a second cut. The term "cutting edge" in the present description of the invention is therefore not restricted to a specific cutting edge on a tool but is used in general to describe the cutting edge present on the tool at the time in the relevant processing step. If in a first processing step the cutting edge on the tool is formed by the cutting edge of a first indexable cutting insert and the cutting edge on the tool in a second processing step is formed by another indexable cutting insert—unless specifically stated otherwise—in spite of the change of indexable cutting insert and possible resulting change of the cutting edge geometry, the "cutting edge" of the tool is still referred to.

In a preferred form of embodiment a first cut is made with a first cutting edge geometry and a second cut with a second cutting edge geometry. Particularly preferably indexable cutting inserts from the group with type designations RNMG 160500, RPMT 160500, RCMT 160500 or RDMT 160500 are used.

In a preferred form of embodiment the cut to be made goes from one end of the pipe to the other end of the pipe. Although embodiments are conceivable in which a pipe is to be produced with a helical recess on the inner side of the pipe but which only extends over a part of the longitudinal extent of the pipe, for example end zones without a recess being provided at the ends of the pipe. However, particularly preferably pipes are provided with a helical recess on the inner side of the pipe which extends over the entire pipe. This also has the advantage at the start of the relevant cut that the cutting edge engages in the pipe material at the start of a cut.

In a preferred form of embodiment in the respective processing step several recesses of the pipe are produced. In a preferred form of embodiment the pipe has n recesses extending helically along the inner side of the pipe. For this, according to a preferred form of embodiment, the method according to the invention envisages a deep hole drilling machine pulling or pushing the tool, which has a basic body extending along a longitudinal axis and n cutting edges arranged on the outer circumference of the basic body, through the interior of the pipe and turning it about its longitudinal axis and/or turning the pipe about its longitudinal axis so that the cutting edges each complete a cut along a helical cutting line on the inner side of the pipe. In an alternative, also preferred form of embodiment the device pushes or pulls the pipe along its longitudinal axis over a tool which has a basic body extending along its longitudinal axis and n cutting edges arranged on the outer circumference of the basic body while turning the pipe about its longitudinal axis and/or turning the tool about its longitudinal axis so that the cutting edges each complete a cut along a helical cutting line on the inner side of the pipe. As described above in relation to the one recess, the respective recess of the n recesses can also be produced by way of several cuts whereby in the case of each cut the tool is pulled or pushed through the interior of the pipe while being turned about its longitudinal axis so that cutting edge completes the respective cut along a helical cutting line on the inner side of the pipe. In an alternative form of embodiment it is conceivable in a pipe with n helically extending recesses along the inner side of the pipe to produce these recesses one after the other (possible carrying out several cuts per recess). However, the processing times are reduced if several cuts can be made simultaneously in one working step. In a preferred form of embodiment the number n of recesses of the pipe is >3. It is not absolutely necessary to work simultaneously on the recesses of the pipe in each working step. For example it is conceivable to work on a pipe with six recesses extending helically along the inner side of the pipe in such a way that with a tool that has a basic body extending in a longitudinal direction and three cutting edges arranged on the outer circumference of the basic body just to produce three of the recesses in a first sequence of working steps and then to produce the remaining three recesses of the six recesses in a second sequence of working steps. It is also conceivable during the first passage of the pipe to make the first cuts for the first three recesses, during the second passage of the pipe to make the first cuts for the second three recesses and during a third passage, possibly after changing an indexable cutting insert having a cutting edge, making the second cut for the first three recesses and during a fourth passage of the pipe making the respective second cut for the second three recesses.

In a preferred form of embodiment a drilling oil or cooling lubricant is introduced into the interior of the pipe which flows contrary to the pulling or pushing direction of the tool through the pipe. The drilling oil or cooling lubricant serves in particular to remove shavings from the interior of the pipe and/or to cool and/or lubricate the tool and/or the workpiece.

In a preferred form of embodiment the radial distance of the cutting edge relative to the longitudinal axis of the body is reduced after ending the first cut (the cutting edge is displaced inwards in the direction of the longitudinal axis of the basic body), the basic body is again introduced into the pipe until it is in the starting position from which the next step is to be carried out, whereupon the radial distance of the cutting edge relative to the longitudinal axis of the basic body is increased again and—in a preferred form of embodiment—is selected to be even greater relative to the previous step. Through this "retraction" of the cutting edge while the basic body is being moved back to the starting position for the next stop the danger is reduced of the cutting edge colliding with a projecting section on the inside of the pipe or with a shaving possibly still present in the pipe. In addition in this way it can be refrained from simultaneously turning the basic body during the longitudinal movement when it is being returned to the starting position, i.e. travelling back along the helical course of the recesses. In a preferred form of embodiment the basic body is only moved in the longitudinal direction with "retracted cutting edges" and only on reaching its axial starting position for the next step is brought into position through rotation for the cutting edge to assume the correct starting position for the next cut.

In a preferred form of embodiment the radial distance of the cutting edge relative to the longitudinal axis of the basic body is not changed during a cut. In this way the design of the tool can be considerably simplified as mechanisms can be dispensed with which have to carry out a positioning movement of the cutting edge during a cut.

In a preferred embodiment the tool is pulled or pushed with a speed of more than 6 m/min, preferably more than 9 m/min through the interiour of the pipe. In a preferred embodiment the pipe is pushed or pulled over the tool with a speed of more than 6 m/min, preferably more than 9 m/min. It was found that with higher speeds an increased calmness of the cutting action is obtained, especially lesser vibrations of the tool, the pipe or the cutting edge are achieved. This is especially true for work pieces (pipes) with ductile materials. The indication of speed is meant especially with regard to the linear component of the movement, hence the speed of the movement in the direction of the longitudal axis of the pipe or the tool.

The tool according to the invention for a deep drilling machine comprises a basic body extending along a longitudinal axis and at least one cutting edge arranged on the outer circumference of the basic body. Particularly preferably the basic body is tubular in design.

In a preferred form of embodiment the tool comprises several, in particular more than three, cutting edges arranged on the outer circumference of the basic body.

In a preferred form of embodiment at least two cutting edges are arranged at the same height along the longitudinal extent of the basic body but at different positions along the circumference of the basic body. Particularly preferably cutting edges which are arranged at the same height along the longitudinal extent of the basic body but at different positions along the circumference of the basic body are distributed symmetrically over the circumference of the basic body. In a preferred form of embodiment the cutting edge geometry of the cutting edges which are arranged along the longitudinal extent of the basic body but at different positions along the circumference of the basic body is the same.

In a preferred form of embodiment at least two cutting edges are arranged at different heights along the longitudinal extent of the basic body and at different positions along the circumference of the basis body. Particularly preferably two cutting edges are arranged along the longitudinal extent of the basic body at different heights and at different positions along the circumference of the basic body in such a way that they lie on a helical line. Particularly preferably the position of the second cutting edge is turned less than 90° about the longitudinal axis relative to the position of the first cutting edge, particularly preferably about less than 45°.

In a preferred form of embodiment the cutting edge geometry of the cutting edges arranged at different heights along the longitudinal extent of the basic body but at different positions along the circumference of the basic body is the same. In an alternative form of embodiment the cutting edge geometry of the cutting edges arranged at different heights along the longitudinal extent of the basic body but at different positions along the circumference of the basic body is different. Different cutting edge geometries are also conceivable, for example one cutting edge, for example the front cutting edge, with an interrupted geometry and a second cutting edge, for example the following cutting edge, with a complete, closed geometry.

In a preferred form of embodiment the cutting edge is provided on an indexable cutting insert, wherein the indexable cutting insert is provided detachably as part of a cassette. Particularly preferably the indexable cutting insert is screwed to part of the cassette.

In a preferred form of embodiment the cassette is movable relative to the basic body. In a preferred from of embodiment the cassette is precisely ground on the circumference and is held in a pocket incorporated into the basic body of the tool. In a preferred from of embodiment the cassettes can slide in the pockets in an adjusting direction.

In a preferred from of embodiment the cassette can be displaced along an oblique plane which is at an angle to the longitudinal axis of the basic body. Through this an adjusting movement of the cutting edge can take place and the radial distance of the cutting edge relative to the longitudinal axis of the basic body can be changed. In a preferred form of embodiment this can be achieved in that the base of the pocket in the basic body of the tool, in which the cassette is arranged, runs at an angle to the longitudinal axis of the basic body. In an alternative form of embodiment this can be achieved in that the pockets in the basic body of the tool have no bases (are open downwards) and the cassette arranged in the pocket is supported by way of a pushing rod arranged in the interior of the basic body, wherein the pushing rod has on its outer circumference surface sections running at an angle to the longitudinal axis of the basic body on which the cassette is supported. If the pushing rod is moved relative to the pockets the cassette moves along the surface section running at an angle to the longitudinal axis of the basic body and thus changes its distance from the longitudinal axis of the basic body.

In a preferred form of embodiment a bar spring is provided which presses the cassette in the direction of the longitudinal axis of the basic body. Additionally or alternatively the cassette can be force-guided via a T-groove incorporated in an oblique plane of the pushing rod.

In a preferred form of embodiment an adjusting mechanism for the position of a cassette movable in relation to the basic body relative to the basic body is provided. The adjusting mechanism preferably comprises in particular an adjusting rod, for example a pushing rod, on the outer surface of which a cassette located in a pocket is supported. A separate actuator can be provided with which the position of the adjusting rod relative to the other part of the basic body can be changed. In this way automatic adjustment of the position of the adjusting rod relative to the basic body is possible. Alternatively a manually-operated adjustment possibility can be provided.

In a preferred form of embodiment a support plate provided on the outer circumference of the basic body is provided. With this the position of the basic body within the pipe during the cutting movement can be determined. In a preferred form of embodiment several support plates are provided distributed over the circumference. In a preferred embodiment a first group of circumferentially placed support plates is provided on one end of the tool and a second group of circumferentially placed support plates is provided on the other end of the tool.

In a preferred embodiment the support plates are elastically supported in the radial direction of the basic body. The elastic support can be achieved by way of springs, such as leaf springs or coil springs, arranged below the support plates. It is also feasible that the elastic support is obtained by a fluid polster, e.g. gas or hydraulic pads arranged under the support plate. The elastic support of the support plate provides the advantage that the support plates can change their position depending on radially acting forces acting upon them. This allows for an evasion in case of chips. In the case of several support plates arranged around the circumference it also allows for a centering function. Thereby the tool can self-center in the pipe. The tool is more tolerant with regard to variations in dimensions of the pipe, especially with regard to a bending of the pipe or diviations from a circular cross section. The tool is floatingly supported by way of the support plates.

In an especially preferred embodiment the tool has a clamping jaw unit (a tongs unit, a grips unit). Especially preferred the tool has a first clamping jaw unit on one end of the tool and a second clamping jaw unit on the other end of the tool. The clamping jaw unit has at least three, preferably more than three tongs, which each can take over the function of a support plate. The individual tong is moveably supported on the outer circumference of the basic body, especially in a swiveling manner by way of swivel axis that point in the circumferential direction of the basic body. Additionally the clamping jaw unit has a counter-piece to each tong, said counter-piece also being attached to the outer circumference of the basic body and moveable in an axial direction along the outer circumference. The counter-piece is spring-loaded, such that an axial movement of the counter-piece along the outer circumference of the basic body from a first position into a second position loads the spring. The tong can be swung to contact the counter-piece with its free end. Here it is especially preferred, if the counter-piece and/or the free end of the tong have inclined contact surfaces. The use of inclined contact surfaces makes it possible that upon swinging the tong towards the outer circumference of the basic body, a first contact between the free end of the tong and the counter-piece is made and upon further swinging of the tong towards the outer circumference of the basic body a gliding of the free end of the tong along the counter-piece leads to an axial movement of the counter-piece, which loads the spring (the counter-piece will be pushed back against the spring). In this way the tong in a clamping jaw unit can take over the function of a support plate elastically supported in the radial direction. The spring executes a restoring force onto the counter-piece, which by way of the inclined contact surface is translated into a radially acting restoring force onto the tong.

In a preferred embodiment the clamping jaw unit unites all counter-pieces of the tongs into one unit, especially preferred a ring, which can be axially moved along the outer circumference of the basic body. The ring preferably has a conical surface, which provides for the inclined contact surfaces of the counter-pieces. In an especially preferred embodiment the ring is seated on the outer circumference of the basic body with play such that a tilting of ring about an axis perpendicular to the longitudinal axis of the tool is possible. The tilting of the ring allows for a spring package arranged behind the ring to be compressed differently, which leads to the generation of axially acting restoring forces that differ over the circumference of the ring, said restoring forces being translated by way of the conical surface of the ring into differently strong radial restoring forces that act on the tongs.

In a preferred embodiment of the clamping jaw unit the counter-piece is pre-loaded into a preferred position. In a preferred embodiment the pre-load can be changed.

In a preferred embodiment of the clamping jaw unit the spring of the counter-piece rests against an abutment. In a preferred embodiment the abutment can be axially moved along the basic body. The axial movement of the abutment along the basic body can change the preloading.

In a preferred embodiment of the clamping jaw unit, the springs of the counter-pieces are provided for by a singular, bush-shaped spring package. Providing a bush-shaped spring package especially provide advantages when used together with a ring that units the counter-pieces into one element.

The use of a clamping jaw unit with swivelling tongs as support plates has the advantage that an inclined surface, namely the radially outward facing surface of the inclined tong comes into contact with the inner circumference of the pipe. This is especially advantages with ductile materials, which tend to smearing. With ductile materials and fixed support plates the risk exists that an edge of the support plate cuts into the ductile material or ductile material piles up in front of the edge, which can lead to an tearing off of the support plate.

In a preferred form of embodiment a nozzle for a drilling oil or coolant lubricant is provided on the outer circumference of the basic body. Particularly preferably a channel is provided within the basic body which leads from a drilling oil or coolant lubricant inlet of the basic body to the nozzle. Particularly preferably several nozzles for a drilling oil or coolant lubricant are provided on the outer circumference of the basic body. Additionally or alternatively within the context of the method according to the invention or in the context of the deep hole drilling machine according to the invention flushing of the intermediate space between the outer circumference of the tool and the inner side of the pipe with drilling oil or coolant lubricant can be envisaged. This can take place in particular in that the drilling oil or coolant lubricant is introduced at one end of the pipe into this intermediate space and emerges from this intermediate space at the other end of the pipe. In a preferred form of embodiment the direction of flow of the drilling oil or coolant lubricant is contrary to the movement of the cutting edge during cutting. Accordingly, if the cutting blade is moved from one end of the pipe to the other end of the pipe, in this preferred form of embodiment the drilling oil or coolant lubricant from the other end of the pipe to the one end. Alternatively it can be envisaged that the direction of flow of the drilling oil or coolant lubricant is selected to flow in the direction of movement of the cutting edge during cutting.

The deep hole drilling machine comprises a tool according to the invention and a linear actuator for the tool with a rotation actuator for the tool.

In a preferred form of embodiment the rotation actuator can put the cutting edge into at least two different starting points for a cut, wherein the starting points differ in the rotational position about the longitudinal axis. A form of embodiment was described above in which the basic body only moves in the longitudinal direction with "retracted cutting edges" and only on reaching its axial starting position for the next cut is moved by rotation into a position in which the cutting edge assumes the correct starting position for the next cut. How far the basic body has to be rotated after reaching the axial starting position depends on the form of the helix to be produced, namely in which rotational position the cutting edge at the end of the cut has left the workpiece in relation to the starting point of the helix. So that the deep hole drilling machine can be used to produce a plurality of different helical recesses it must be able to bring the cutting edge into at least two different starting positions for one cut, wherein the starting points differ in terms of their starting points about the longitudinal axis. Particularly preferably the deep hole drilling machine can place the cutting edge at each point about 360°, i.e. at a total of 360 or 3600 or 36000 or 360,000 different starting points. Particularly preferably the deep hold drilling machine can place the cutting edge in more than 360 different starting points for one cut, wherein the starting points differ in terms of their rotational position about the longitudinal axis.

A system according to the invention comprises a deep hole drilling machine according to the invention with a tool according to the invention, wherein for the tool several different cassettes are provided on which an indexable cutting insert comprising the cutting edge can be detachably fastened. Through the shape of the cassette, in particular through varying the distance of the connection points of the indexable cutting insert with the cassette (usually the thread into which a screw holding the indexable cutting insert on the cassette is screwed) from the surface with which cassette is supported on the basic body, the distance of the connection point of the indexable cutting insert to the longitudinal axis of the basic body and thus the distance of the cutting edge to the longitudinal axis of the basic body can be influenced. With such a system, while retaining a basic body, it becomes possible to work on pipes with different inner diameters through selecting the suitable cassette.

In a preferred form of embodiment the method according to the invention is carried out with the deep hole drilling machines according to the invention. In a preferred form of embodiment the pipe is a centrifugally cast pipe.

In a preferred form of embodiment the centrifugally cast pipe according to the invention is made of an alloy with 0.4 to 0.6% carbon, 28 to 33% chromium, 15 to 25% iron, 2 to 6% aluminium, up to 2% silicon, up to 2% manganese, up to 1.5% niobium, up to 1.5% tantalum, up to 1.0% tungsten, up to 1.0% titanium, up to 1.0% zirconium, up to 0.5% yttrium, up to 0.5% cerium, up to 0.5% molybdenum, up to 0.1% nitrogen, remainder nickel including melt-related impurities. Particularly preferably it is made of an alloy which individually and together contains 0.4 to 0.6% carbon, 28 to 33% chromium, 17 to 22% iron, 3 to 4.5% aluminium, 0.01 to 1% silicon, 0.01 to 0.5% manganese, 0.01 to 1.0% niobium, 0.01 to 0.5% tantalum, 0.01 to 0.6% tungsten, 0.001 to 0.5% titanium, 0.001 to 0.3 zirconium, 0.001 to 0.3% yttrium, 0.001 to 0.3% cerium, 0.01 to 0.5% molybdenum, 0.001 to 0.1% nitrogen.

The centrifugally cast pipe according to the invention has an inner profile which has at least one recess extending helically along the inner side of the pipe, wherein the centrifugally cast pipe has been produced with a method according to the invention. The centrifugally cast pipe is in particular characterised by an inner rib running helically at an angle of inclination of 20° to 40° relating to the pipe axis and in the form of a wave line with rib troughs and rib peaks of equal curvature radius adjoining each other mirror-symmetrically, in which the flank angle ($\beta$) of the respective tangent at the point of contact of the two curvature radii (R) in relation to the perpendicular on the radius (Ri) of the circle contacting the rib domes at the peak point of each rib trough or rib peak is 16° to 25°. Particularly preferably the centrifugally cast pipe has one of the geometries of the inner rib and rib troughs and rib peaks described in EP 1 525 289 A1.

The invention will be described below with the aid of drawings showing only examples of embodiment of the invention. In these:

FIG. 3 shows a perspective view of a basic body of a tool according to the invention with a section of a removed pushing rod;

Figure 1:
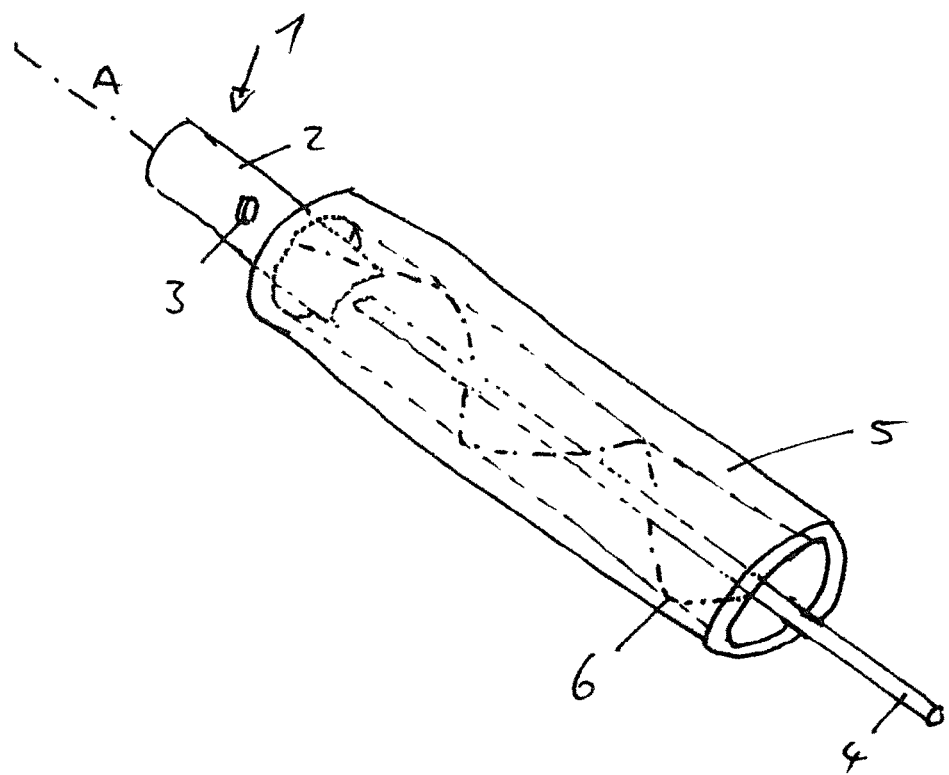
FIG. 1 shows a schematic perspective view of a tool according to the invention in a pipe illustrating the cutting line to be completed by the cutting edge of the tool.

FIG. 1 shows a tool 1 according to the invention with a basic body 2 extending along a longitudinal axis A and a cutting edge 3 arranged on an outer circumference of the basic body 2. In the basic body 2 a pushing rod 4 is provided which can be moved relative to the basic body 2.

The basic body 2 of the tool 1 is connected via thread, not shown in FIG. 1, with a drilling pipe 101 (not shown in FIG. 1) of the deep hole drilling machine 100. The deep hole drilling machine 100 can pull the basic body 2 via the drilling pipe 101 both through the centrifugally cast pipe 5 also shown in FIG. 1 and also turn it during the pulling movement. In FIG. 1 the dashed line 6 shows the cutting line along which the cutting edge 3 cuts the material of the centrifugally cast pipe 5 while the basic body 2 is being pulled through the centrifugally case pipe 5 and turned.

From FIG. 1 it can be seen that in one form of embodiment in which the basic body 2 comprises a further cutting edge on its outer circumference which is arranged at the same height as the shown cutting edge 3, but at different position in the circumferential direction, for example opposite the shown cutting edge 3 a second helical cut is simultaneously made in the centrifugally cast pipe 5.

Figure 2:
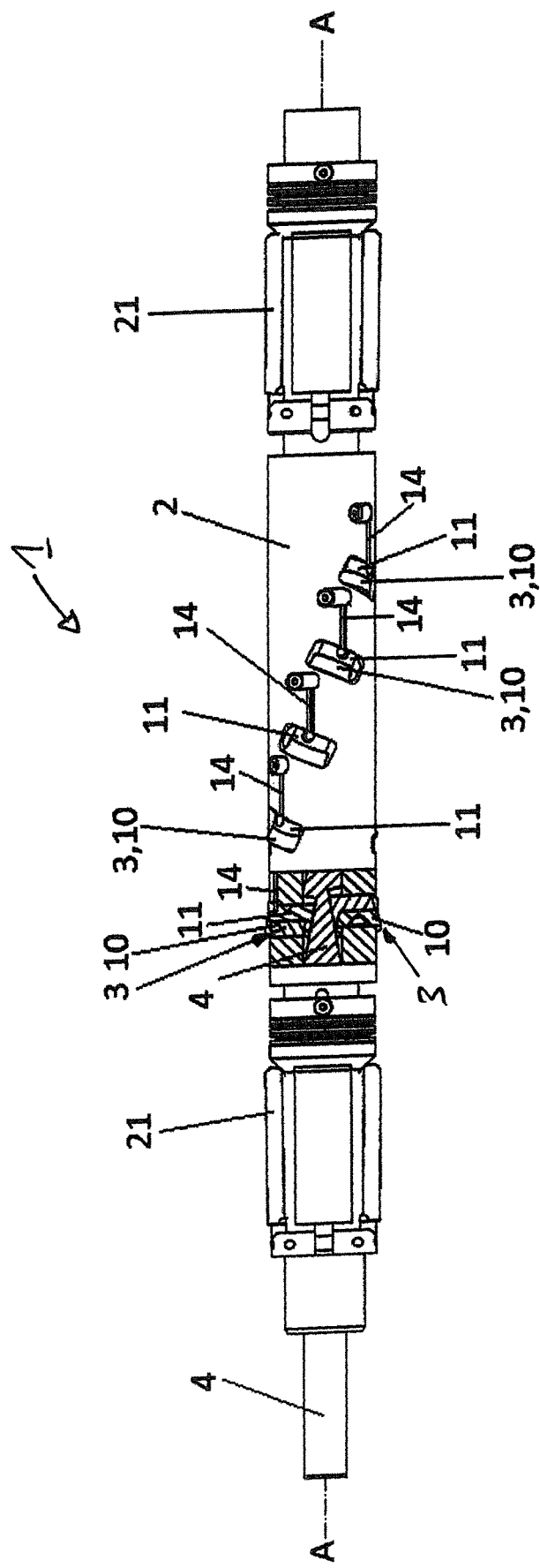
FIG. 2 shows a perspective view of a tool according to the invention.

In the form of embodiment shown in FIG. 2 the tool 1 according to the invention has a basic body 2 on the outer circumference of which there are cutting edges 3. The cutting edges 3 are formed on indexing cutting inserts. The indexing cutting inserts 10 are each detachably connected to a part of a cassette 11, namely screwed thereto. The cassette 11 is displaceably arranged in a recess (pocket) on the basic body 2. They are held in the recesses (pockets) by bar springs 14.

From the area of FIG. 2 shown in section it can be seen that the pushing rod 4 has, in the area of the pockets and the cassettes 11 arranged in the pockets, a surface section 20 which runs at an angle to the longitudinal axis A of the basic body 2. In the form of embodiment shown in FIG. 2 it is envisaged that the pushing rod 4 has two opposite surface sections 20 which each run at an angle to the longitudinal axis A of the basic body 2, as in the form of embodiment shown in FIG. 2, at the same height along the longitudinal axis A of the basic body 2 two opposite cutting edges 3 on two opposite indexing inserts 10 are provided which are each screwed to a part of a cassette 11 assigned to each of them, wherein the respective cassette 11 is located in a pocket assigned to it in the basic body and is supported on the respectively assigned surface section 20 of the pushing rod 4.

From the area of FIG. 2 shown in section it can be seen that, when the pushing rod 4 is moved relative to the basic body 2, the respective cassette 11 slides along the assigned oblique surface section 20 of the pushing rod and the position of the cutting blade 4 relative to the longitudinal axis A can thereby be changed.

In each case five cutting edges 3 are arranged at a different height along the longitudinal extent of the basic body 2 and at different positions along the circumference of the basic body 2 that they lie on a helical line. In each case two cutting edges 2 are arranged at the same height along the longitudinal extent of the basic body 2 but at different positions along the circumference of the basic body 2.

FIG. 2 also shows that the basic body 2 of the tool 1 is held between two clamping jaw units 21 which are spring loaded.

FIG. 3 shows a perspective view of a basic body 2 of a tool according to the invention with a section of removed pushing rod 4. It can be seen that the basic body 2 can be composed of sub-assemblies 22. This makes it possible to adjust the length of the basic body 2 and/or the number of cutting edges of the basic body 2 to the desired processing work.

The section of removed pushing rod 4 shown in FIG. 3 shows that the pushing rod 4 can also be composed of sub-assemblies 23 so that the adjustment of the basic body 2 can also be shown through an adjustment of the pushing rod 4. It can also be easily seen from FIG. 3 how the surface sections 20 running at an angle to the longitudinal axis A can be designed.

FIG. 3 also shows that a basic body 2 with 5 recesses (pockets) at the same height along the longitudinal extent of the basic body 1 can be produced into each of which cassettes 11 with indexing cutting inserts 10 can be arranged. In this way, with one such basic body 2, with one cut five recesses helically extending along the inner side of the pipe can be produced. To show this better the cassettes 11 and the indexing cutting inserts 10 are shown once mounted on the on the surface sections 20 on the far left sub-assembly 23 of the pushing rod 4.

Figure 4:
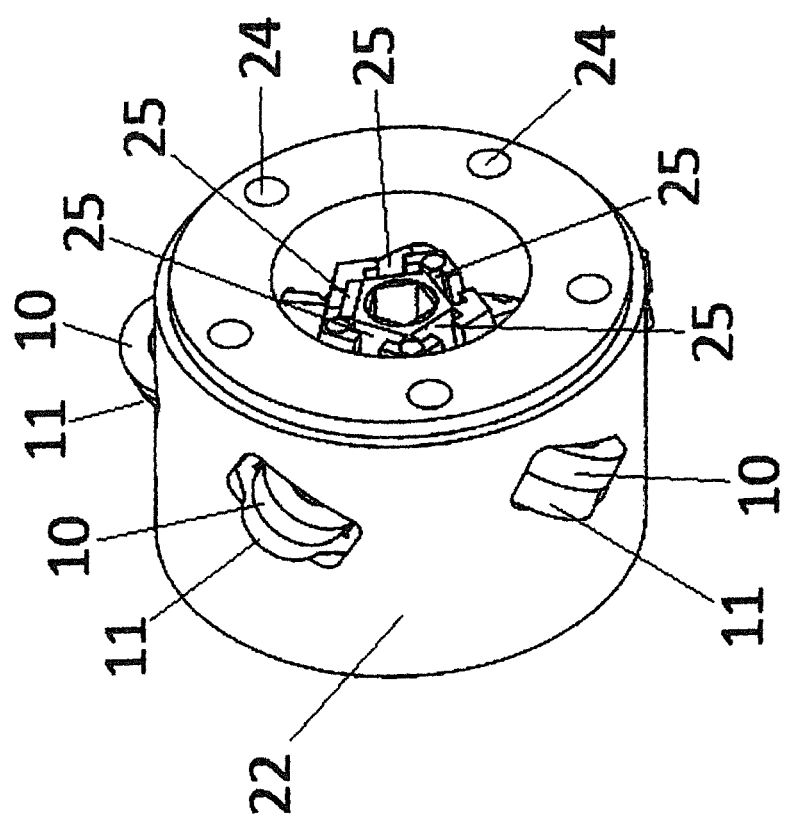
FIG. 4 shows a sub-assembly of the basic body according to FIG. 3 with a pushed-in sub-assembly of the pushing rod.

FIG. 4 shows a sub-assembly 22 of the basic body 2 according to FIG. 3 with the inserted sub-assembly 23 of the pushing rod 4. FIG. 4 illustrates that the sub-assembly 22 of the basic body 2 has through holes 24 through which fitting screws are passed with which the individual sub-assemblies 22 of the basic body 2 can be connected to each other.

FIG. 4 also shows that the sub-assembly 23 of the pushing rod 4 as part of the angled surface section 20 has a T-shaped groove 25 which is also at an angle. The cassette 11 has a T-shaped foot (not shown in FIG. 4) which engages in a T-shaped groove 25 and is displaceably guided therein. Between the T-shaped foot and the remaining parts of the cassette 11 a spring can be provided which acts on the remaining parts of the cassette 11 relative to the foot in the direction of a preferred position. During a movement of the pushing rod 4 in the longitudinal direction A the foot moves within the T-shaped groove 25 and migrates outwards along this groove so that the position of the cassette 11 can be adjusted relative to the longitudinal axis A.

Figure 5:
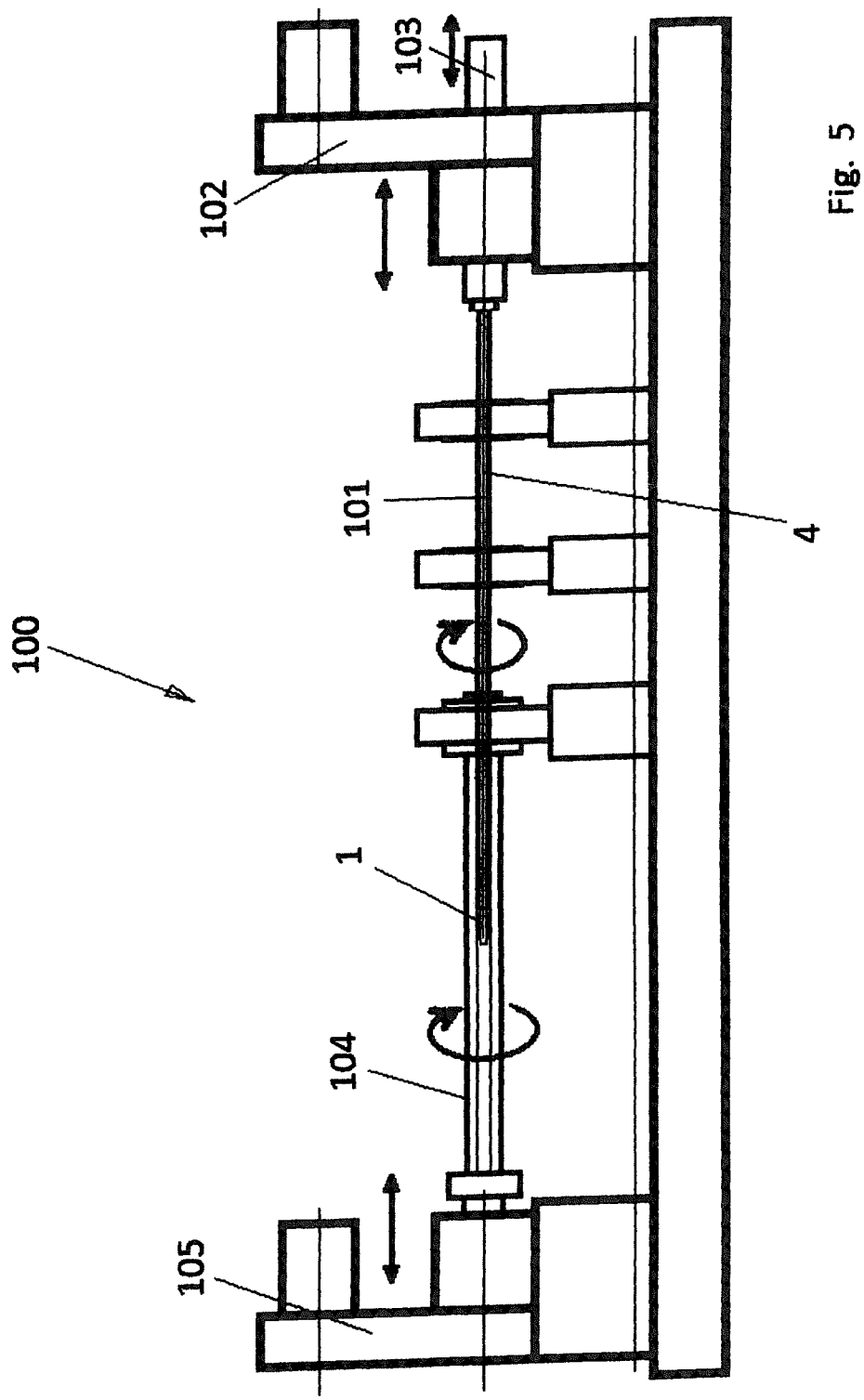
FIG. 5 shows a schematic side view of a deep hole drilling machine according to the invention and FIG. 6 a schematic side view of a clamping jaw unit.

FIG. 5 shows a schematic side view of a deep hole drilling machine 100 according to the invention. It shows the tool 1 according to the invention which is connected to a drilling pipe 101 by means of thread. A first actuator unit 102 can turn and axially push or pull the drilling pipe 101 (and thereby the tool 1 connected to the drilling pipe 101). The actuating unit 102 has angle indexing so that the tool 1 can be precisely brought into the pipe 104 to be worked on in a desired angular position.

The pushing rod 4 extends in the drilling pipe 101. On the drive unit 102 a further drive unit 103 is provided with which the axial position of the pushing rod 4 relative to the basic body 2 of the of the tool 1 can be adjusted.

In FIG. 1 the tool is shown in a position between the left end of the pipe 104 to be worked on and the right end of the pipe to be worked on. To produce the recess running helically along the inners side of the pipe 104 the tool 1 is moved with retracted cutting edges 2 to the left end of the pipe 104 and there brought into the required angular position in the circumferential direction of the inner side of the pipe 104. Thereafter the cutting edges 3 are extended through axial movement of the pushing rod 4 relative to the basic body 2 and are then pulled with the deep hole drilling machine 100 of the tool 1 through the interior of the pipe 104 while being turned about the longitudinal axis so that the cutting edges 3 complete a cut along a helical cutting line on the inner side of the pipe 104.

The deep hole drilling machine 100 has another actuator unit 105 with which the pipe to be worked on can be axially moved and turned. The invented superimposed rotational movement and axial movement of the tool relative to the pipe during cutting can thus be achieved by way of the actuating unit 102 alone or the actuating unit 105 alone or through a combination of the actuating units 102, 105.

Figure 6:
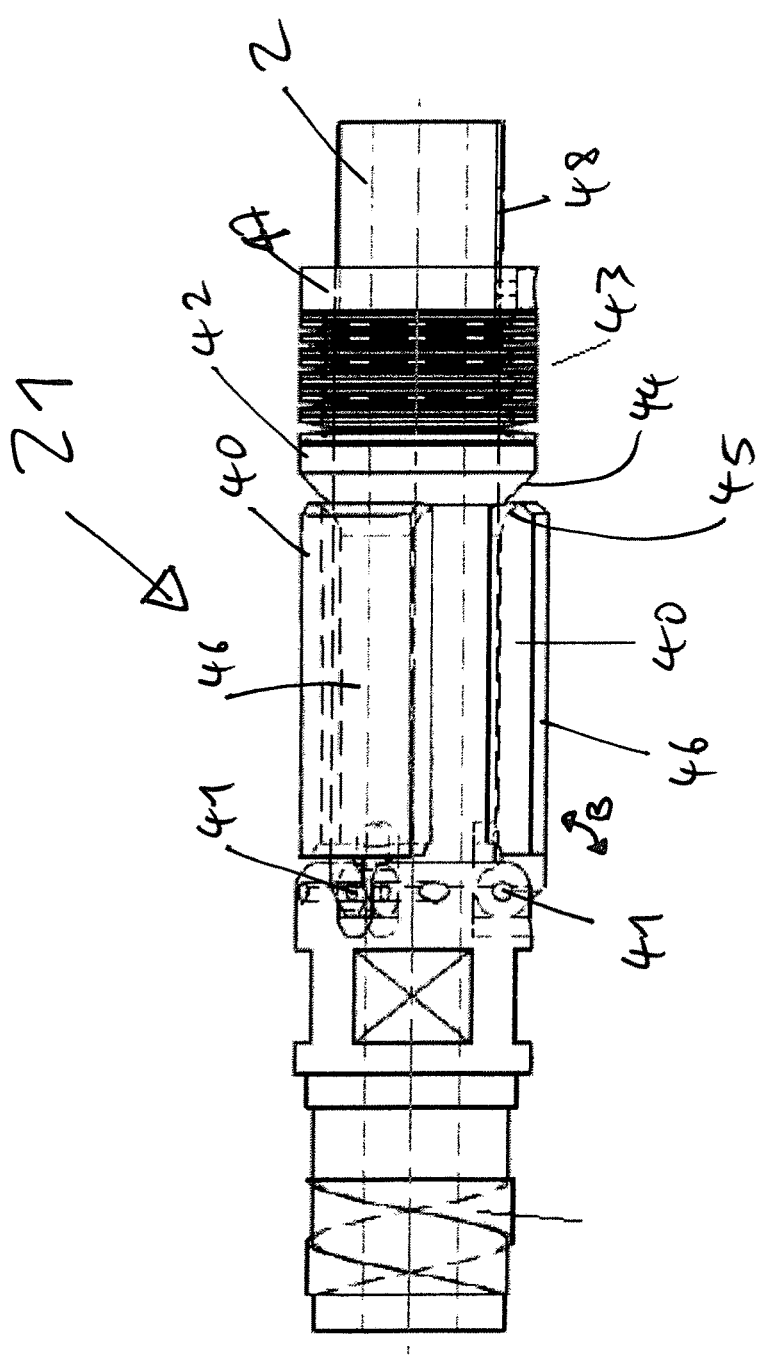

The clamping jaw unit 21 shown in FIG. 6 has three tongs 40, which each can take over the function of a support plate. The individual tong 40 can swivel about a swivel axis 21 that points in the circumferential direction of the basic body 2

(see swivel arrow B). Additionally the clamping jaw unit 21 has a conical ring 42, which can be moved in axial direction along the outer circumference of the basic body 2. The ring 42 units the counter-pieces provided for each tong 40 into one element. The ring 42 is spring-loaded by way of a bush-shaped spring package 43, such that an axial movement of the ring 42 along the outer circumference of the basic body 2 from a first position (see FIG. 6) into a second position (further to the right from the position shown in FIG. 5) loads the spring package 43. The ring 42 is supported on the outer circumference with play and kann tilt about an axis perpendicular to the longitudinal axis A, for example can move further to the right from the position shown in FIG. 6 at the top compared to the bottom. This allows for returning force to be generated that differ in strength along the circumference of the ring 42.

The ring 42 that units the counter-pieces into one element has a conically arranged contact surface 44. The free end of the tong 40 has a inclined contact surface 45. The use of the inclined contact surfaces allows for the movement of the tong 40 towards the ring 42 to lead to a first contact between the free end of the tong 40 and the ring 42, while a further movement of the tong 40 toward the outer circumference of the basic body 2 leads to a gliding of the free end of the tong 40 along the contact surface 44 of the ring 42 that leads to an axial movement of the counter-piece, which pre-loads the spring package 43. In FIG. 6 an arrangement is shown, where the tong 40 is not pre-loaded; the tongs 40 rest on the outer circumference of the basic body 2. The ring 42 and the abutment of the spring package 43 have been moved so far to the right in FIG. 6 that the spring package 43 has completely relaxed and still does not press the ring 42 against the free end of the tongs 40. This arrangement constitutes the minimal diameter of the tongs 40. The FIGS. 2 and 3 show arrangements where the tongs 40 are in contact with ring 42. One can see in FIGS. 2 and 3 that the tongs 40 protrude radially over the remainder of the basic body 2.

Swivelling of the tong 40 towards the outer circumference of the basic body 2 is achieved by way of contact between the radially outward facing surfaces 46 of the tongs 40 and the inner surface of the pipe (not shown in FIG. 6). A smaller inner diameter of the pipe leads to the tongs being forced further inwards as is the case with a wider inner diameter. Obviously providing several tongs 40 also allows to act upon diviations fo the shape of the inner circumference of the pipe from the circular.

At the end of the spring package 43 a threaded ring 47 provides an abutment. The threaded ring 47 has an inner thread and by way of turning can be axially moved along an outer thread 48 provided on the outer circumference of the basic body. By way of axially moving the threaded ring 47 the pre-tension of the spring package 43 can be changed.

In FIG. 6 the basic body continues towards the right with the part of the basic body 2 that has the pockets and cassettes 11. Towards the left in FIG. 6 a thread 49 is shown that allows the basic body 2 to be connected to the drilling pipe 101.

The invention claimed is:

1. Deep hole drilling method for producing a centrifugally cast nickel chromium iron alloy pipe with an inner profile that has a recess extending helically along the inner side of the centrifugally cast nickel chromium iron alloy pipe, comprising:
    pulling or pushing, with a deep hole drilling machine, a tool which comprises a basic body extending along a longitudinal axis and at least one cutting edge arranged on the outer circumference of the basic body at an oblique angle to the longitudinal axis, through the interior of the centrifugally cast nickel chromium iron alloy pipe while the tool is turned about its longitudinal axis (A) and/or the centrifugally cast nickel chromium iron alloy pipe is turned about its longitudinal axis (A), so that the at least one cutting edge completes a cut along a helical cutting line on the inner side of the centrifugally cast nickel chromium iron alloy pipe,
    or
    pushing or pulling, with a deep hole drilling machine, the centrifugally cast nickel chromium iron alloy pipe along its longitudinal axis (A) over a tool which comprises a basic body extending along a longitudinal axis and at least one cutting edge arranged on the outer circumference of the basic body at an oblique angle to the longitudinal axis, wherein the centrifugally cast nickel chromium iron alloy pipe is turned and/or the tool is turned about its longitudinal axis (A) so that the at least one cutting edge completes a cut along a helical cutting line on the inner side of the centrifugally cast nickel chromium iron alloy pipe;
    wherein the deep hole drilling machine is configured to drill holes with a diameter of 0.2 to 2000 mm and a drilling depth more than 3 times the diameter.

2. Deep hole drilling method according to claim 1, wherein the recess extending helically along the inner side of the centrifugally cast nickel chromium iron alloy pipe is produced by way of several cuts, including the cut, wherein
    pulling or pushing, during each cut of the several cuts, the tool through the interior of the centrifugally cast nickel chromium iron alloy pipe while the tool is being turned about its longitudinal axis (A) and/or the centrifugally cast nickel chromium iron alloy pipe is turned about its longitudinal axis so that the at least one cutting edge completes a relevant cut of the several cuts along the helical cutting line on the inner side of the centrifugally cast nickel chromium iron alloy pipe
    or
    pulling or pushing, during each cut of the several cuts, the centrifugally cast nickel chromium iron alloy pipe over the tool, wherein the centrifugally cast nickel chromium iron alloy pipe is turned about its longitudinal axis and/or the tool is turned about its longitudinal axis (A) so that the at least one cutting edge completes a relevant cut of the several cuts along the helical cutting line on the inner side of the centrifugally cast nickel chromium iron alloy pipe.

3. Deep hole drilling method according to claim 1, wherein a radial distance of the at least one cutting edge relative to the longitudinal axis (A) of the basic body is changed between a first and a second cut.

4. Deep hole drilling method according to claim 1, wherein the inner profile has n recesses helically extending along the inner side of the centrifugally cast nickel chromium iron alloy pipe and
    pulling or pushing, with the deep hole drilling machine, the tool, the basic body of the tool being tubular and extending along the longitudinal axis (A) and the at least one cutting edge comprising n cutting edges arranged on the outer circumference of the basic body at oblique angles to the longitudinal axis, through the interior of the centrifugally cast nickel chromium iron alloy pipe while the tool is turned about its longitudinal axis (A) and/or the centrifugally cast nickel chromium iron alloy pipe is turned about its longitudinal axis so that the n cutting edges each complete a different cut, including the cut, along a different helical cutting line on the inner side of the centrifugally cast nickel chromium iron alloy pipe or pushing or pulling, with a deep hole drilling machine, the centrifugally cast nickel chromium iron alloy pipe along its longitudinal axis over the tool, the basic body of the tool extending along the longitudinal axis and the at least one cutting edge comprising n cutting edges arranged on the outer circumference of the basic body at oblique angles to the longitudinal axis, wherein the centrifugally cast nickel chromium iron alloy pipe is turned about its longitudinal axis and/or the tool is turned about its longitudinal axis (A) so that the n cutting edges each complete a different cut along a different helical cutting line on the inner side of the centrifugally cast nickel chromium iron alloy pipe.

5. Deep hole drilling method according to claim 1, wherein a drilling oil or coolant lubricant is introduced into the interior of the centrifugally cast nickel chromium iron alloy pipe and flows contrary to the pulling or pushing direction of the tool through the centrifugally cast nickel chromium iron alloy pipe.

6. Method according to claim 1, wherein the recess of the inner profile of the centrifugally cast centrifugally cast nickel chromium iron alloy pipe comprises at least one recess extending helically along the inner side of the centrifugally cast nickel chromium iron alloy pipe.

7. The method according to claim 1, wherein the centrifugally cast nickel chromium iron alloy pipe comprises:
0.4 to 0.6% carbon;
28 to 33% chromium;
15 to 25% iron;
2 to 6% aluminium;
up to 2% silicon;
up to 2% manganese;
up to 1.5% niobium;
up to 1.5% tantalum;
up to 1.0% tungsten;
up to 1.0% titanium;
up to 1.0% zirconium;
up to 0.5% yttrium;
up to 0.5% cerium;
up to 0.5% molybdenum;
up to 0.1% nitrogen;
remainder nickel including melt-related impurities.

8. The method according to claim 7, wherein the centrifugally cast nickel chromium iron alloy pipe comprises:
17 to 22% iron;
3 to 4.5% aluminium;
0.01 to 1% silicon;
0.01 to 0.5% manganese;
0.01 to 1.0% niobium;
0.01 to 0.5% tantalum;
0.01 to 0.6% tungsten;
0.001 to 0.5% titanium;
0.001 to 0.3 zirconium;
0.001 to 0.3% yttrium;
0.001 to 0.3% cerium;
0.01 to 05% molybdenum; and
0.001 to 0.1% nitrogen.

9. The method according to claim 1, wherein the at least one cutting edge of the tool comprises a plurality of cutting edges, and wherein a plurality of the plurality of cutting edges is arranged on the outer circumference of the basic body at an oblique angle to the longitudinal axis.

10. The method according to claim 1, wherein the at least one cutting edge of the tool comprises a plurality of cutting edges, and wherein each of the plurality of cutting edges is arranged on the outer circumference of the basic body at an oblique angle to the longitudinal axis.

11. The method according to claim 1, wherein the at least one cutting edge of the tool comprises a plurality of cutting edges, wherein the plurality of cutting edges are arranged to lie on a helical line.

12. The method according to claim 1, wherein the at least one cutting edge of the tool comprises a plurality of cutting edges,
wherein the basic body is cylindrical,
and wherein the plurality of cutting edges are arranged within recesses on the basic body such that at least a portion of each of the plurality of cutting edges is arranged within its corresponding recess below an outer circumference of the basic body.

13. The method according to claim 1, wherein the tool comprises a plurality of recesses, wherein each recess comprises a cassette and a cutting edge arranged within the recess.

* * * * *